UNITED STATES PATENT OFFICE.

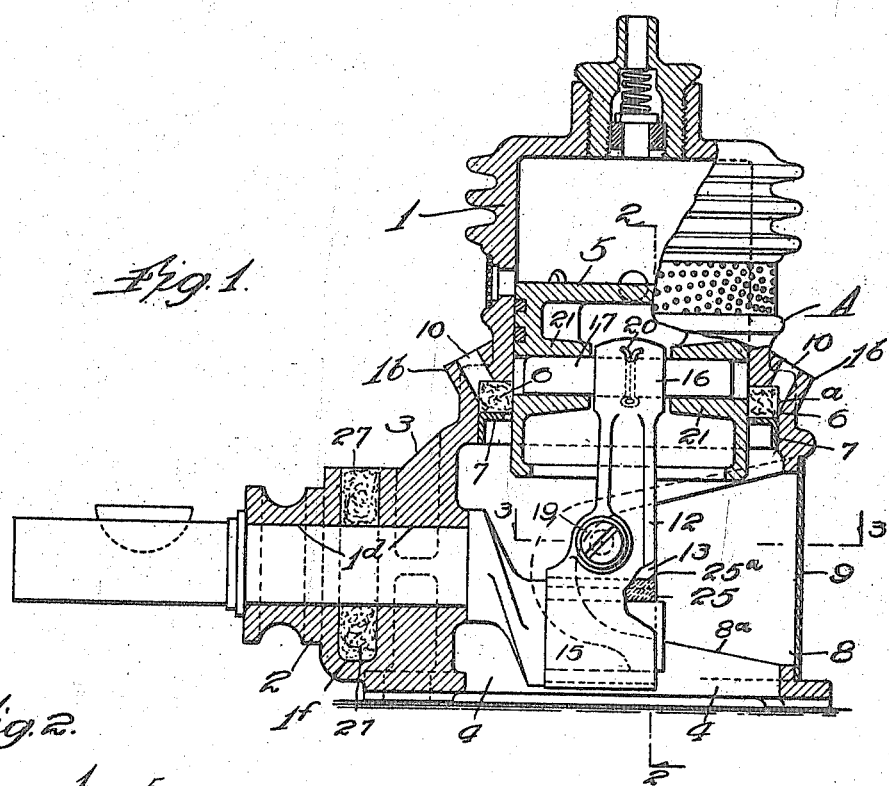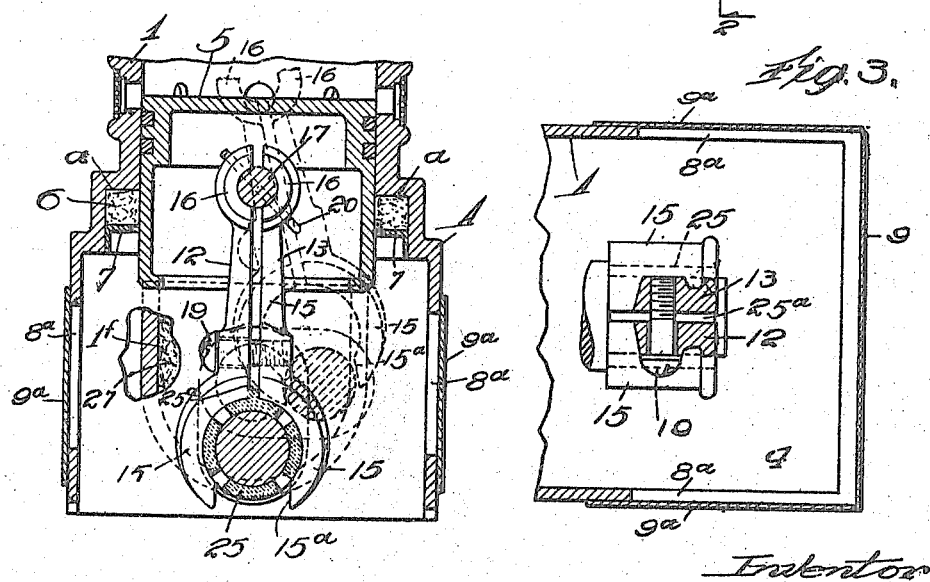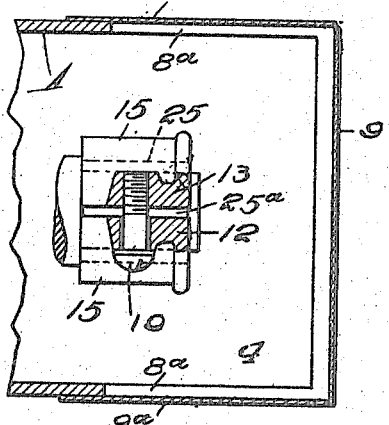

JOSEPH BERG, OF CHICAGO, ILLINOIS, ASSIGNOR TO STEWART-WARNER SPEEDOMETER CORPORATION, OF CHICAGO, ILLINOIS, A CORPORATION OF VIRGINIA.

PUMP.

1,264,144.   Specification of Letters Patent.   Patented Apr. 30, 1918.

Application filed May 17, 1917. Serial No. 169,235.

*To all whom it may concern:*

Be it known that I, JOSEPH BERG, a citizen of the United States, residing at Chicago, in the county of Cook and State of Illinois, have invented new and useful Improvements in Pumps, of which the following is a specification, reference being had to the accompanying drawings, forming a part thereof.

The purpose of this invention is to provide an improved and especially compact form of pump adapted especially for inflating the tires of an automobile, but adapted also for other uses. It consists in the elements and features of construction shown and described, as indicated in the claims.

In the drawings:—

Figure 1 is a vertical axial section of a pump embodying this invention.

Fig. 2 is a section at the line, 2—2, on Fig. 1.

Fig. 3 is a section at the line, 3—3, on Fig. 2.

The pump shown in the drawings comprises a casing, A, embodying integrally the cylinder, 1, the crank shaft bearing, 2, and a supporting portion, 3, occupying the angle between the inner end of the cylinder and the inner end of the crank shaft bearing. Said supporting portion is open at the end opposite the inner end of the cylinder, that is, at the bottom,—to the full extent of the diameter of the cylinder for the purpose of admitting through that end the piston, 5, and also the piston lubricating wick, 6, and retaining ring, 7, for the wick; and said supporting portion is also apertured at the side opposite the inner end of the crank shaft bearing widely enough to admit the crank shaft with the crank thereon inserted through said supporting portion for entering the crank shaft into its bearing. The bottom aperture of the supporting portion is indicated by the numeral, 4, and the lateral aperture in said supporting portion for admission of the crank shaft of the crank is designated 8. The supporting portion is skeletonized by extending the opening, 8, around both sides, as seen at $8^a$, $8^a$, and this entire front and side opening is closed, to guard the crank and pitman when the pump is in operation, by a sheet metal cap member, 9, which is adapted to be applied from the forward side with the two wings, $9^a$, $9^a$, embracing the casing and engaging snugly the margins of the openings, $8^a$, $8^a$, so that said cap is retained safely by friction. The piston lubricating ring or bushing is retained in position in the rabbet, $a$, formed about the cylinder for seating said lubricating ring, by means of the sheet metal retaining ring, 7, which is right-angled in cross-section, as shown, and adapted to be forced into position in the rabbet under the lubricating ring, and to be securely retained for holding the lubricating ring by its frictional engagement with the rabbet wall. Oiling apertures, 10, 10, are formed in the exteriorly-sloping shoulder, $1^b$, of the casing, reaching the rabbet and affording means of supplying lubricant to the lubricating ring, 6. The casing being integral as described, the piston and crank shaft with the crank thereon being introduced through the openings in the supporting portion as described, it is necessary to provide means for introducing the pitman and connecting it properly with the piston and with the crank wrist; and this is accomplished by splitting the pitman lengthwise, axially with respect to the crank wrist so that it consists of two parts, 12 and 13, each of which has a portion, 15, for embracing the crank wrist, and a portion, 16, for engaging the piston pivot pin, 17. The two parts, 12 and 13, are secured together by means of a screw, 19, positioned quite close to the crank-wrist-engaging end, the two piston-pin-engaging parts being relatively positioned properly about the piston by means of a cotter pin, 20, passing through them and through the said piston pivot pin, 17, so that the pivotal action shall be in the piston at the pivot bearings, 21, 21, therein provided, thus preventing the undesirable pivotal action of the split bearing portion of the pitman upon the pivot pin. The disadvantage of having a split bearing engaging the crank wrist is obviated, and an additional advantage in assembling is obtained by providing a sleeve or bushing, 25, on the crank wrist, two members of the pitman being clamped onto this sleeve and not directly onto the crank wrist.

The order of assembling of the parts is as follows: The two parts, 12 and 13, are assembled with the end portions, 16, 16, clasped onto the piston pivot pin, 17, and pinned thereto by a cotter pin, 20, before the piston is introduced into the cylinder. The piston being then put in place and followed by the lubricating ring, 6, and the retaining ring, 7, the crank shaft with the crank thereon is introduced into the crank shaft bearing through the open opposite sides of the skeletonized supporting portion of the casing, the pitman being swung aside for that purpose. The end portions, 15, 15, of the pitman, formed for clasping the crank wrist and the bushing sleeve thereon are constructed so that when the two parts, 12 and 13, are assembled as described, clasping the piston pivot pin, said pitman parts are parted at their extremities beyond the crank wrist clasping portion, 15, widely enough as shown at 15$^a$ to admit the crank wrist between them; and when the crank shaft is in place in the bearing, the pitman being swung to one side so as to bring the parting between said parts in the path of rotation of the crank wrist, as seen in dotted line in Fig. 2, the latter may be entered through said parting between the clasps, 15, 15. The bushing sleeve, 25, may then be entered endwise onto the crank wrist and into the clasp, and the clamp screw, 19, being tightened, the pitman is securely held in place. The bushing sleeve, 25, may have a fin, 25$^a$, engaging between the two parts of the pitman as seen in Fig. 2.

For lubricating the crank shaft, a bearing, 1$^d$, has a transverse cavity, 1$^t$, which is U-shaped transaxially of the shaft, and which accommodates a lubricating bushing of felt or other oil-absorbent material, 27, whose upper end is exposed at the upper end of said cavity for receiving oil, and which is of course suitably apertured for the shaft to pass through it at the middle.

I claim:—

1. A pump comprising a casing which embodies integrally a pump cylinder and a pump crank shaft bearing and a supporting portion in the angle between the inner end of the cylinder and the inner end of the crank shaft bearing, said supporting portion being open opposite the end of the cylinder to the full extent of the diameter of the cylinder for insertion of the piston, and open opposite the crank shaft bearing to accommodate the crank in inserting the shaft into the bearing through said supporting portion, in combination with a pitman split longitudinally axially of the crank wrist, and means for clamping the two parts together onto the crank wrist.

2. A pump comprising a casing which embodies integrally a pump cylinder and a pump crank shaft bearing and a supporting portion in the angle between the inner end of the cylinder and the inner end of the crank shaft bearing, said supporting portion being open opposite the end of the cylinder to the full extent of the diameter of the cylinder for insertion of the piston, and open opposite the crank shaft bearing to accommodate the crank in inserting the shaft into the bearing through said supporting portion, in combination with a pitman split longitudinally axially of the crank wrist, and means for clamping the two parts together about the crank wrist, and a pitman bushing on the crank wrist which is clamped rigidly between the two split members of the pitman, and which constitutes the bearing of the pitman on the crank wrist.

3. A pump comprising a casing which embodies integrally a pump cylinder and a pump crank shaft bearing and a supporting portion in the angle between the inner end of the cylinder and the inner end of the crank shaft bearing, said supporting portion being open opposite the inner end of the cylinder to the full extent of the diameter of the latter for admission of the piston in assembling, the cylinder being rabbeted at the lower end to afford a seat for an annular oiling wick, and an annular sheet-metal wick-retainer, angular in cross section, frictionally held in said rabbet below the wick.

4. A pump comprising a casing which embodies integrally a pump cylinder and a pump crank shaft bearing and a supporting portion in the angle between the inner end of the cylinder and the inner end of the crank shaft bearing, said supporting portion being open opposite the inner end of the cylinder to the full extent of the diameter of the latter for admission of the piston in assembling, the cylinder being rabbeted at the lower end to afford a seat for an annular oiling wick, and an annular sheet metal wick retainer, angular in cross section, frictionally held in said rabbet below the wick, the casing having oil inlet holes leading from the outer side to said rabbet.

5. A pump casing comprising integrally the pump cylinder and the crank shaft bearing, and a skeletonized supporting portion at the angle between the inner end of the cylinder and the inner end of the crank shaft bearing, having its openings adequate for the insertion of the piston into the inner end of the cylinder, and the crank shaft with its crank attached into the inner end of the crank shaft bearing.

6. In combination with a casing comprising integrally a pump cylinder, a crank shaft bearing and a supporting portion in the angle between crank of the cylinder and the inner end of the crank shaft bearing, said supporting portion being open opposite the cylinder for introduction of the piston into the cylinder, and opposite the crank shaft bearing for introduction of the crank shaft into the bearing of the crank thereon; a pitman split longitudinally in the plane of the piston pivot pin axis and the crank wrist axis, and provided with means for engaging the split parts together on the piston pivot pin; the opposite ends of said parts being formed to clasp the crank wrist, and being parted at their extremities to admit the crank wrist between them into the clasping parts, and means for clamping the pitman parts together.

7. In combination with and comprising integrally a pump cylinder, a crank shaft bearing and a supporting portion in the angle between the inner end of the cylinder and the inner end of the bearing, said supporting portion being open opposite the cylinder for introduction of the piston into the cylinder, and opposite the crank shaft bearing for introduction of the crank shaft into the shaft bearing with the crank thereon; a pitman split longitudinally in the plane of the piston pivot axis and the crank wrist axis, and provided with means for engaging the split portions together on the piston pivot pin, the opposite end of said parts being formed to clasp the crank wrist with space thereabout for a bearing sleeve or bushing; such bearing sleeve or bushing being adapted to be inserted endwise into the clasp and onto the crank wrist, and means for clamping the parts onto the bearing sleeve or bushing.

In testimony whereof, I have hereunto set my hand at Chicago, Illinois, this 12 day of May, 1917.

JOSEPH BERG.